Nov. 19, 1968  J. R. BECKWITH  3,412,402
WARNING SYSTEM FOR VEHICLES
Filed Sept. 1, 1966
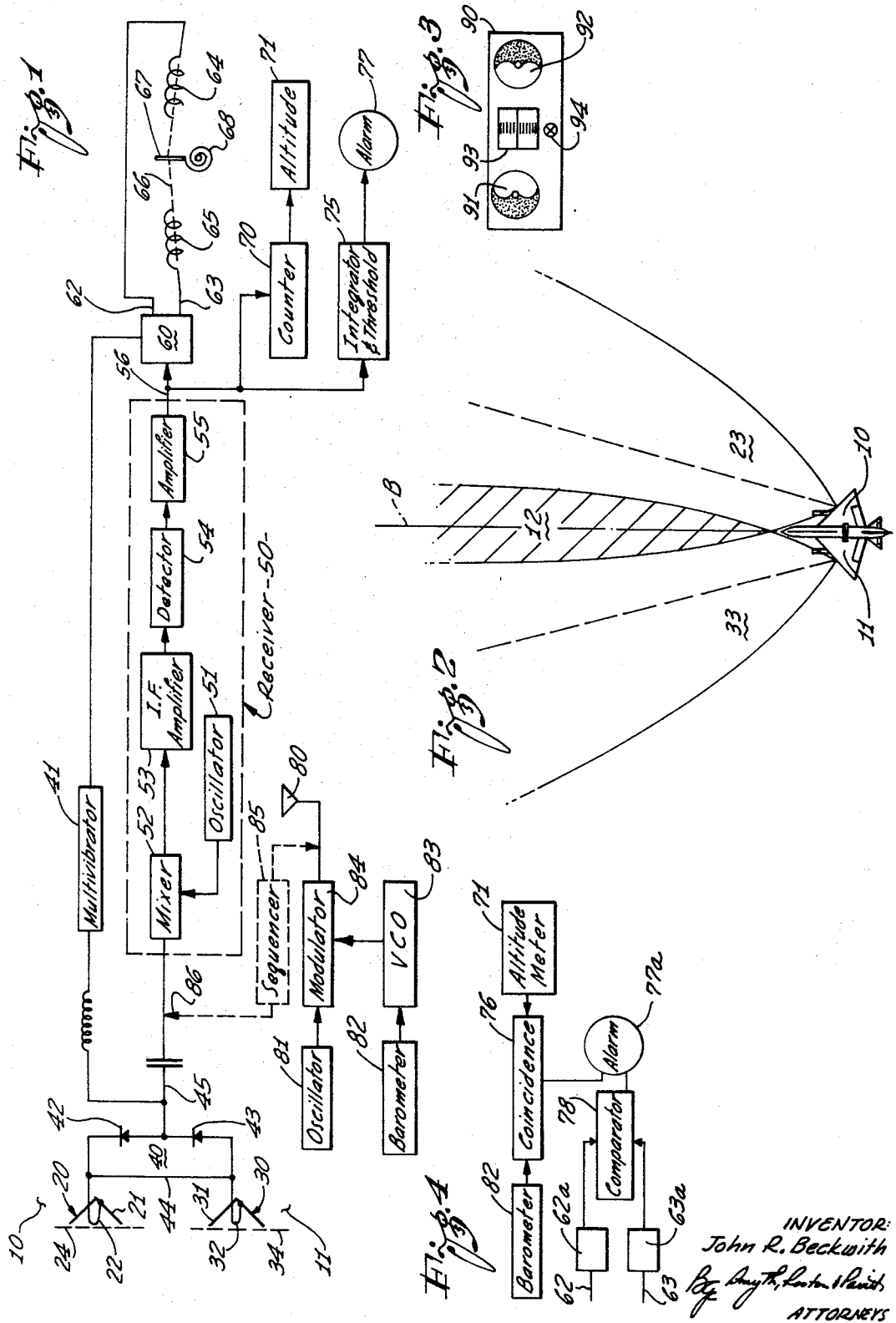
INVENTOR:
John R. Beckwith
By Smyth, Roston & Pavitt
ATTORNEYS

United States Patent Office 3,412,402
Patented Nov. 19, 1968

3,412,402
WARNING SYSTEM FOR VEHICLES
John R. Beckwith, Pacific Palisades, Calif., assignor to Packard-Bell Electronics Corporation, Los Angeles, Calif., a corporation of California
Filed Sept. 1, 1966, Ser. No. 576,655
3 Claims. (Cl. 343—112)

ABSTRACT OF THE DISCLOSURE

A warning anti-collision system for aircraft is disclosed in which each aircraft is equipped with an omnidirectionally broadcasting transmitter. The transmitted signal has particular frequency and is modulated with information concerning altitude of the aircraft. Each aircraft is further equipped with a receiver system in which receiving antennas are symmetrically arranged and have asymmetrically located lobes and at a small angle to the boresight. The receiver circuit alternatingly receives the signals as picked up by the two antennas and provides an indication of the relative strength and of the altitude of the transmitter from which the signal is received. A particular warning signal is provided if the signal received exceeds a predetermined limit. Additional equipment responds to similarity of the signals as received and provides comparison of altitude indications of the received signal and of the receiving aircraft to provide a special alarm in case there is a collision course.

---

The present invention relates to an anti-collision, warning system for moving vehicles. While the principles of the invention permit employment of the warning system for any kind of vehicles, the warning system will find preferred utility for aircrafts.

The need for such an air anti-collision warning system for aircraft is obvious and does not have to be expounded or justified. Here it has to be observed that this need would not be so great if air traffic were limited to flights of military and relatively large commercial aircraft equipped with radar or which are radar guided from cooperating ground control stations or both. However, a sizeable portion of the ever-increasing air traffic falls to the small, privately owned aircraft, being neither ground controlled nor having radar equipment.

While it is open to argument whether or not it may be possible to require all aircrafts to be equipped with radar, economical aspects compel the search for a simpler and more economical warning system, not less reliable but sufficient to provide for proper warning if two aircrafts move in too close proximity to each other. The system, in particular, must be of the type that each individual aircraft can be provided with warning signals as to the presence of another aircraft and this presence must be definable to an extent and with a degree of accuracy sufficient for the pilot of the aircraft to permit him to conduct the necessary avoiding maneuver.

A small, rather slowly flying aircraft does not need to be warned in a manner which differentiates among various situations at great detail. A warning system may well suffice, wherein one can define rather generally a danger condition or very few such danger conditions, so that the aircraft can readily maneuver to avoid the danger, bearing in mind that slowly flying planes can make avoiding maneuvers rather easily, so that, for example, a "near miss" situation and a "hit" situation may be treated as similar dangers.

A fast and thus less maneuverable aircraft may require a representation differentiating among different danger conditions to a great extent, because even a "near miss" which can still be determined with certainty to be a "miss" and not a "hit," may not require an avoiding maneuver at all, bearing in mind here that avoiding maneuvers themselves become more difficult or even dangerous the faster a plane flies. Thus the system must be of the type which permits any aircraft to extract from all other aircrafts in its vicinity the amount of information it needs, whereby one can say in general that the faster the aircraft, the more detailed has to be the information concerning danger situations, but it is essential for the system in accordance with the invention that it permits a small aircraft to provide and to receive such information sufficient for the safety of the aircraft itself as well as of the entire air traffic in its environment, and without requiring expensive installations; the latter point is an important one to render such a system generally acceptable and to make it a requirement for all participants in the air traffic.

In accordance with the invention, it is suggested to provide each aircraft with a transmitter having an antenna which is, for example, a one-quarter wave omnidirectional radiator. A simple dipole mounted to and projecting from the tail of the aircraft well suffices. The transmitter broadcasts signals of a constant and known frequency band; this signal includes a carrier which is modulated with a signal representing the height of the aircraft.

In its most simple form, there is provided a barometer producing an electric signal which is converted into a constant amplitude signal the frequency of which is a representation of the environmental atmospheric pressure which in turn, on the average, is dependent upon the height of the aircraft above ground in accordance with a known exponential function. This height responsive signal is used, as stated, to modulate the carrier frequency of the transmitter selected to be in the UHF range, preferably at the upper range end thereof. With this type of signal, an aircraft signals its presence to the environment, and the presence signals includes additional information as to its height.

The aircraft is next provided with a receiver system having two simply built directional antennas, each having a main lobe which extends ahead of the aircraft, and the two lobes may overlap or have a common margin or zone along the boresight of the aircraft. The antennas are, preferably, folded quarter-wave monopoles individually mounted in reflecting cavities built into the leading edge of each wing of the aircraft. These reflecting cavities may be covered with material which is transparent to the radiation expected to be received by the antenna, so that the aerodynamic conditions of the wings are not disturbed.

The beam width of the lobes each may for example be about 30° wide, and the center of each lobe is about 15° off the boresight at oppositely oriented angles for each antenna cavity and in a horizontal plane. This way the overlapping lobe region is quite small. The zone or region covered by the two receiving antennas is, therefore, a cone with an apex angle of about 45° in the horizontal and 30° in the vertical.

A lobe switch connects the two antennas alternatingly to a receiver circuit. The receiver circuit, first of all, is responsive to any signal of the particular carrier frequency expected to be received and received by either of the antennas. Such a signal is amplifid to a more suitable level. The signals thus provided represent, in alternate lobe switch cycles, the signals as received by the two differently oriented antennas.

If the transmitter from another aircraft the signal of which is being received, is in the overlapping lobe portion, then the signals during alternate lobe switch cycles are of equal or approximately equal amplitude. If the other aircraft transmits from outside of either lobe no information signal will be received by either antenna. If the other aircraft has a position so that its transmitter is in one lobe only, then the receiver output signals will have different amplitudes in alternating lobe switch cycles. This difference of the output signals of the receiver circuit during alternating lobe switch cycles can be used to provide an indication, which is different from the indication provided when the two lobe switched signals have similar amplitudes.

This indication of the spatial lobes-transmitter relation is independent from the fact that the transmitter signal is modulated. Since, however, demodulation is to be provided in the receiver for other reasons, it is more convenient to use the amplitude of the demodulated signals during alternating lobe switching cycles, rather than the carrier as received. Thus, for all signal evaluating processes, including signal strength comparison, one can use the demodulated receiver output signal. It thus suffices to provide for a single output of the receiver circuit, but it should be noted that it is basically possible to utilize the un-demodulated, alternating lobe switched signals for purposes of determining relative strength thereof.

For determining the altitude of the other, transmitting aircraft, the demodulated receiver output is not necessarily separated as to lobe switch cycles, but the entire signal train as received by the receiver of the receiving aircraft is used to provide an indication of altitude of the other, transmitting aircraft. The terminology, receiving aircraft, and, transmitting aircraft, is used only for convenience of describing particular relations, but it should be borne in mind that each aircraft transmits and receives.

The receiver output will be used further to provide an indication of a special danger situation existing in case of too close a proximity of the aircrafts in relation to each other. This danger situation is evidenced by a rather strong signal received in any or either of the two receiver antennas, provided the transmitter strength is known, preferably standardized. Thus a threshold device is used to provide a particular alarm signal if the signal as received exceeds a threshold value. The alarm may be audible, a red light, a flashing light or any combination of such devices or equivalents thereof.

It can be seen that the system does not preclude more detailed analysis of the signal as received. For example, highly directional receiving antenna systems may pinpoint the location of a transmitter rather accurately, and the Doppler effect can be used for distance determination. However, the invention is concerned with a minimum requirement system. One additional, not too expensive processing of the signals may include a comparison of the altitudes of the two aircraft coupled with an indication of approximate similarity of the two lobe switched signals, should that be the case, as an indication that the two aircrafts are on a straight head-on collision course.

It may be advisable if the transmitter of an aircraft has a power output proportionate to or otherwise related to the normal cruising speed so as to take into account, that danger conditions are similar for larger distances between two aircrafts, the faster the respective transmitting aircraft is, if one takes the position that any transmitting aircraft is a danger for any receiving aircraft. One can see that this proportioning of the power output does not place an additional economic burden on the owner of a small, slowly flying aircraft, as he still needs to have only a relatively weak transmitter, but benefits from a stronger transmitter of a very fast flying aircraft. The fast flying aircraft may detect the slow flying aircraft later than the slow one detects the fast one. This is immaterial, as it is the slowly flying aircraft which more readily can and should avoid collision by maneuvering out of the mutual danger zone. A power output of, for example, 100 milliwatts for a small aircraft will be sufficient.

An increase in sensitivity can be provided with little additional cost by sequencing transmitting and receiving operations, so that the side lobes of the receiving antennas of an aircraft will not pick up the signals of its own transmitter. It can be seen that this extends in effect the detecting range of the receiver of an aircraft, because such a sequencing or alternation between transmission and reception will improve the signal-to-noise ratio in the signals as received.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIGURE 1 illustrates somewhat schematically a block and circuit diagram for a receiver system within the system of the present invention;

FIGURE 2 illustrates somewhat schematically the main lobes of receiver antennas mounted in accordance with the principles of the present invention;

FIGURE 3 illustrates somewhat schematically a front view of a suitable indicator panel providing a representation of danger and warning signals as established in a modification of the circuit shown in FIGURE 1; and FIGURE 4 illustrates a modification of the circuit shown in FIGURE 1 to provide a more sophisticated warning system.

Proceeding now to the detailed description of the drawings, in FIGURES 1 and 2 thereof, there is shown a pair of airplane wings 10 and 11, and in the leading edges thereof, 24 and 34 respectively, there are embedded two antennas 20 and 30. Each of these antennas basically comprises a funnel-shaped or parabolic metallic reflector cone such as 21 and 31. In each of these cones there is mounted a folded monopole, such as monopoles 22 and 32, having their respective ends connected electrically to the cones proper while the outlet portion of each monopole traverses insulatedly the cone and leads to a switching circuit 50.

Each of these receiving antennas has a main lobe, 23 and 33 respectively, and the two antennas are mounted in the aircraft wings in such a manner that the center of each lobe has an angle of about 15° to the boresight B. The lobe centers and the boresight extend substantially in a horizontal plane. Each lobe may have an angular width somewhat above 30°, so that there is a border zone or even a small overlapping portion 12 which is common to the two lobes 23 and 33 along boresight B. These angular dimensions are given here by way of example only and are by no means critical, except that the two receiving antennas should have pronounced lobes, obliquely oriented to each other and oriented further towards the forward direction and region of the plane.

In order to avoid any aerodynamic problems, the large opening of each antenna cone may be covered with a material which is transparent to the frequency of interest here, and the cover over an antenna cone will be flush with the aircraft wing, thus having a contour matching that of the leading edge of the wing. The frequencies employed are in the UHF range, usually in the upper end of the UHF range where the UHF range begins to merge with the microwave range. A suitable frequency which can be employed is 1 or 2 kmc. or thereabouts. For these frequency ranges two small antenna cones of the type described and having dimensions commensurate with the size and dimensions of even a small aircraft still permit the development of sufficient directional sensitivity and lobe characteristics.

The two antennas are interconnected by a phase line 44, but a switching circuit 40 causes the two receiving antennas to be alternately connected to the input circuit of a receiver circuit 50. The switching circuit 40 is governed, for example, by a multivibrator 41 having a frequency which is well below the UHF operating frequency to which the input circuit of the receiver is tuned. It is quite possible to use a vibrator, or a rotating mechanical switch instead, but an electronic multivibrator 41 is preferred because it produces less noise.

The multivibrator 41 renders diodes 42 and 43 alternatingly conductive, to thereby connect either the monopole 22 or the monopole 32 to the output line 45 of the switch. Output line 45 is capacitively coupled to the input of the receiver 50.

The receiver 50 is actually of a standard type and requires only a brief description. There is provided a local oscillator 51 which incorporates an oscillator proper and frequency multiplier stages connected thereto. The output of this oscillator with multiplier stages may, for example, be 1.01 kmc. if the receiver frequency of interest is 1 kmc. The receiver circuit includes further a mixer stage receiving the output signal from switch 40 as well as the output of oscillator 51 to establish the differential frequency thereof as an intermediate frequency of 10 mc. The IF signal still is modulated with the intelligence which is included as modulation in the signals as received by the antennas. It should be pointed out, that the frequency of multivibrator 41 should also be below this intermediate frequency.

The output of mixer 52 is amplified in an IF amplifier 53. The modulation, to be defined more fully below, is separated from the IF signal in a detector 54 and amplified by a low frequency type amplifier 55 having a broad bandwidth. The output side or output channel 56 of receiver 50 furnishes now the demodulated output signals to the following stages and units:

As the aircraft progresses along its flight path, it may receive a 1 kmc. signal, and the source of such a signal has a particular spatial relationship to the aircraft. The source of the signals as received will have a particular angular relationship to the lobes 23 and 33 of the receiving antennas 20 and 30. If that signal source is somewhat to the right of the boresight of the receiving aircraft, then the antenna 20 will pick up a signal which may be rather strong, while the antenna 30 may pick up a weak signal or no signal at all. By operation of the lobe switch 40 it appears, therefore, that during the multivibrator phase in which the antenna 22 is effectively connected to the receiver, a strong signal will be received by the receiver circuit whereas during the other half period or half-cycle of multivibrator 41 the antenna 33 will receive only a very weak signal or even only noise.

There is now provided a second phase or lobe switch 60 connecting the output side of the receiver 50 alternately to the two channels 62 and 63. The lobe switch 60 is operated also by the multivibrator 41. Thus the lobe switch 60 is operated in precise phase synchronism with the lobe switch 40. One of the output channels, for example channel 61, is thus associated with the antenna 22, and the other output channel, 63, of the lobe switch 60 is then associated with the antenna 32. It follows that by operation of the two lobe switches the channel or line 62 receives a demodulated signal as derived from the signal received by antenna 22, while the channel or line 63 receives the demodulated signal as it was received by antenna 32.

The channels 62 and 63 while originating in lobe switch 60 may include rectifiers and/or filters to remove the lobe switch frequency and higher frequencies from the signal, so that the channel receives a signal the amplitude of which is proportionate to the strength of the respective signal as received. However, smoothing of the signal in each channel as to elimination of the lobe switch frequency and others may inherently occur in the circuit elements as controlled by each channel, and to be described next.

It is now presumed that the gain of amplifier stage 55 provides a sufficiently strong and amplified signal so that the signals fed to lines 62 and 63 are strong enough to energize coils, such as coils 64 and 65. These two coils operate in a differential manner on an armature 66 carrying an instrument pointer 67 which is part of the instrument panel in the aircraft. The pointer-armature assembly is spring biased by a spring 68. The pointer 67 is maintained by the spring 68 in the central position illustrated when no current flows in either coil.

It is now apparent that by operation of multivibrator 41 and of lobe switches 40 and 60 the coil 64 will receive a stronger signal than the coil 65 in case the transmitter whose signals are received is located in the lobe 23 and outside of the lobe 33. Therefore, the coil 64 will pull pointer 67 more to the right to thereby indicate the pilot that there is a transmitter broadcasting the particular frequency of interest to the right of his aircraft. Analogously, should such a transmitting source be in the lobe 33 and outside of or only close to the border section of lobe 23, then coil 65 will receive a stronger current than coil 64, and the pointer 67 will shift to the left.

Should a transmitter be very much to the right, say 50° or 60° in relation to the boresight of the aircraft, then the current in either coil will be rather weak, and the pointer will move to the left or to the right for a short distance only or may retain its central position by operation of the spring 68. This then is an indication to the pilot that the transmitter is not dangerously close in the direction of his flight path. It is apparent that the receiver circuit should not include an AGC circuit, as such a circuit would tend to equalize the signals in alternate lobe switch phases or cycles. Such an equalization is not desirable. Furthermore, the total amplification as provided in receiver 50 determines, for a given transmitter output, the spatial relation of transmitter and receiving antennas to produce a noticeable deflection of pointer 67.

The instrument having pointer 67 as visible indicator indicates the relative strength of the signals as received by the two antennas. Thus the instrument must be insensitive to amplitude variations at the rate of the multivibrator frequency or higher frequencies. The inherent filtering characteristics of coils 64 and 65 may already provide such a frequency response, so that rectifiers and filters in channels 62 and 63 may not be required, provided that the modulation of the signals, if AM and as received is likewise outside of the frequency response of the instrument, or such modulation in FM.

It shall now be presumed that, for example, a signal as broadcasted and received is additionally AM or FM modulated by a signal indicative of the altitude of the transmitter. It is that modulation which is separated from the carrier by and in detector 54. Since the instrument arrangement 60 through 68 is and should be insensitive to this modulation, the input side of lobe switch 60 could be connected to the output side of amplifier 53. This may, however, necessitate additional amplification stages in the channels 62 and 63 and is thus an uneconomical modification though a principally possible one. On the other had, if one connects the input side of lobe switch 60 to the output of amplifier 53 and if the additional cost resulting from the employment of additional amplifiers at input or output of the lobe switch 60 is not an additional undue burden, then amplifiers 54 can be provided with an AGC circuit which is of advantage for the second channel.

The second channel to which the receiver output circuit in general or channel 56 in particular is connected now uses the demodulated altitude information which has been modulated into the signal as broadcasted by the transmitter. It shall be assumed that this modulation is a signal, the frequency of which is proportionate to the altitude of the transmitter. There is thus provided a counter 70 which counts wave cycles of the demodulated signals.

The counting result is provided at the counter output after a fixed period of time has elapsed, and the counting is repeated cyclically for continuous operation. The count result is a direct representation of the frequency of the demodulated signal which frequency in turn is presumed to be proportionate to the altitude of the transmitter. Thus the indicating portion 71 of the counter 70 may have its dial calibrated in altitude measuring units rather than showing merely counting digits.

Before proceeding to the description of the third channel to which the output side 56 of the receiver 52 (or of amplifier 53) is connected, it is advisable now to refer to the fact that an aircraft as described does not only have a receiver circuit as described thus far, but is also provided with a transmitter. This transmitter is indicated only schematically; it includes a transmitter circuit and a rather omnidirectional antenna 80 which may be attached to the tail end of the aircraft. Antenna 80 may be a simple quarter wavelength dipole.

The transmitter frequency is provided by an oscillator 81 which actually may include similar components, or even identical components as they are being used in the oscillator 51 of the receiver circuit. For example, the two units 51 and 81 may have a common oscillator proper, and each unit then has its own frequency multiplier stages to arrive at the respectively desired frequencies. Thus, it is merely a matter of convenience for the present description to use the summarizing terms, oscillators, for the units 51 and 81 and to describe them as separated units.

Next there is provided a barometer 82 measuring the outside pressure in the environment of the airplane which, within the limits of meteorological variations, is a rather accurate representation of the altitude of the aircraft. The pressure is about inversely proportionate to an exponential function of altitude. This barometer 82 provides an electric output which drives and controls a voltage controlled oscillator 83, VCO for short, so that the output frequency of the VCO 83 is, for example, proportionate to the altitude of the craft.

It should be mentioned, that this relation between pressure, altitude and VCO otuput as aforedescribed is only an example and one possibility among several. There is no inherent necessity that the frequency of this signal representing the altitude information of the particular aircraft is in fact proportionate to the altitude in a strictly linear relationship. The basic aspect of the inventive system is consistency and uniformity of and within the system as used as a whole throughout the entire air traffic. Thus, each receiver receiving this altitude information signal must be equipped with instruments interpreting the signal in the same manner. This points to the fact that for realizing this consistency and uniformity, proper calibration of the altitude indicator connected to the receiver output circuit is the principal requirement. It is not important, where pressure is converted into altitude information, as it is important only that all transmitters and all receivers are designed to follow the same rules of the altitude representation. Thus the frequency of VCO 83 may be proportionate to the outside pressure, and at the receiver side, the indicator 71 may include a simple digital-to-analog converter with a scale calibrated in altitude units, even though the counter 70 provides a counting number which represents directly a pressure indication. A simple integrator circuit could be used as well. The higher the modulating frequency received, the larger the deflection on a simple moving-coil-meter will be, indicating higher altitude.

Proceeding now with the description of the transmitter circuit, the output of VCO 83 is applied as a modulator signal to a modulator 84 receiving also the output of oscillator 81 as carrier. The modulator output signal is then fed to the antenna 80 for transmission. Thus the aircraft broadcasts continuously a signal which is indicative of altitude and in a rather omnidirectional transmission pattern. An aircraft which picks up such a signal from another aircraft will after demodulation be provided with an indication of the altitude of the other aircraft; the counter 70 and the altitude indicator 71 properly calibrated are provided for this purpose as aforedescribed.

Of course, the frequency range covered by the VCO 83 of one aircraft and appearing as demodulated signal in the receiver circuit of another aircraft, should be outside of the range of the frequency of the multivibrator 41 operating the lobe switches of the receiver of that other aircraft. For example, the multivibrator frequency can be below the lowest frequency representing the lowest altitude that can be indicated. For example, if the relationship is 1 c.p.s. per yard altitude, and if the counter 70 and the indicating instruments 71 operate in units of one yard per counting and indicating step, then the frequency of multivibrator 41 may be below 1 c.p.s. However, the input circuit for counter 70 must be desensitized to eliminate harmonics of the switching frequency which harmonics may simulate some meaningless altitude representations. Alternatively, the multivibrator 41 may have a switching frequency of at least twice the frequency representing the highest altitude measuring signal expected to be received. For the 1 c.p.s.-per-yard scale, that would be a frequency above $10^4$ c.p.s., which is well below the carrier and IF frequencies employed. This highest altitude value is of course a relative value, but it is obvious that an instrument in a plane, particularly a small plane, does not have to differentiate any more among different altitude representations above the highest altitude to which the receiving plane can possibly climb.

The signal which is broadcasted by the transmitter of an airplane which is straight ahead, i.e., right in the flight path of another aircraft, is thus transmitted from a source which appears to be located in the overlapping lobe section 12 of the receiving antenna system. This holds true both ways, either aircraft transmitting and receiving signals from the respective other aircraft. Thus no indication is provided by the indicators 67 of either aircraft. Of course the altitude indicators 71 of the two aircrafts each should provide a signal, but it must be observed that the receiver of an aircraft will pick up some signals at all times, even if such signals are close to or even below the noise level, and thus the altitude indicator 71 will always indicate some value which is of no interest as long as there is no additional information, such as a definite deflection or motion of pointer 67.

In most instances a transmitting aircraft will move into the flight path of a receiving plane from a lateral direction, so that there will be a definite deflection by pointers 67 of either craft before the respective other plane is actually directly in the flight path of the receiving plane. From the point of view of either pilot, the altitude indication then present in his instrument is in fact meaningful associated with the indicative deflection of his pointer 67 as concurrently provided.

However, in regions of high traffic density, for example, in the air space between two large cities, many planes will have a parallel course but flying in opposite directions. If these course directions are positioned at least approximately in a vertical plane then the indicator 67 may not be deflected or may be deflected very little; here then the altitude information becomes critical, but the pilot of either or both planes may still not be aware of the situation as he does not (and cannot) notice any deflection of pointer 67.

The third output channel at the receiver side takes care of this situation. The principal function of this third channel is to monitor proximity of any aircraft in the lobe cone as set by the two receiver antennas in front of the respectively receiving aircraft. The third channel of the receiver output processing circuit comprises an integrator 75 which eliminates the lobe switching frequencies and provides an average signal for the two antenna signals as alternatingly provided by the receiver circuit. Additionally integrator 75 is provided with threshold characteristics as far as production of an output is concerned. Thus integrator 75 is, for example, a Schmitt trigger type element having a lowpass filter at the input side and responding only to a minimum, average output of the receiver 50.

The output of this threshold element 75 is used to trigger an alarm device 77 which thus provides an indication that there is a particular danger situation, requiring immediate and drastic attention on the part of the pilot. The alarm device merely signals proximity of another aircraft, and the concurrent altitude indication impliedly shows the pilot how he can avoid the danger. In most instances the planes flying towards each other will not have identical altitude, but there may be too little difference in their respective altitudes; this suffices to tell either pilot in which direction they have to move their planes so as to increase that altitude difference: The higher one to go up, the lower one to go down. In case of initially identical altitudes, a lateral maneuver in accordance with general rules of air traffic will take care of the danger.

It can be seen that this entire system when installed in all aircrafts, permits rather simple cooperation among the different airplanes; it requires very few and very simple and economical components. One particular point should be considered here in addition, and that is the possibility that the broadcasting antenna of the aircraft should be as omnidirectional as possible in order to produce this presence signal of the aircraft, to be received by any other aircraft wherever it may be within the range of the transmitter antenna. However, the transmitter antenna 80 on any aircraft should, of course, not influence its own receiving antenna system. The orientation of the receiving antennas as described basically suffices here, but it should not be overlooked that even a highly directional antenna system as provided by the antennas 20 and 30 still has several side lobes, and the transmitting antenna may well happen to be in one of the side lobes.

Theoretically it is possible to place the transmitting antenna outside of any of the side lobes of the receiving antennas of the same aircraft. Such location however presupposes that the lobes all are very accurately defined. On the other hand, it must be expected that for reasons of manufacturing tolerances, and due to possible reflection of the broadcasted signal parts of the aircraft, some interference may be unavoidable in any particular aircraft.

This interference can be inhibited by providing a sequencer; a sequencer 85 is illustrated in FIGURE 1 as optional equipment. The sequencer 85 may have a frequency which is still lower than the frequency of the multivibrator 41, and, of course, its frequency should preferably be outside of the barometric modulation range. The sequencer 85 may govern the system by two additional gates symbolically indicated at 86 and 87. The sequencer 85 may, for example, also be a multivibrator, and it alternately blocks the input (or output) of receiver 50 and the output of modulator 84, which is the transmitter output. In this way the receiver of an aircraft will never be enabled during the period when its transmitter broadcasts and vice versa.

FIGURE 3 illustrates somewhat schematically a small instrument panel as it can be used in the aircraft to provide for the desired indication of the three output channels of the receiver 50. This panel, however, includes a modification based on the following aspect. It is convenient and economical to provide for a single indication (pointer 67) of the two receiver antenna signals, as is shown in FIGURE 1. However, there is no necessity to provide for an indication of the relative strength of the signals from each antenna; instead the strength of the signals in channels 62 and 63 can be indicated separately. By concurrent observation of representations of the two signal strengths, the pilot may then conclude as to their relative strengths.

The definition of magic eye may be considered as: a device that converts electrical magnitude of a voltage into deflection in an electron tube. This has been used extensively as a "tuning eye" in broadcast receivers to indicate proper tuning.

In FIGURE 3 there are shown two magic eyes 91 and 92 individually receiving the outputs of the output channels 62 and 63 of the lobe switch 60. The magic eyes are opened individually to the extent of the signal strength as received by the respective antennas. It can be seen that in case the transmitting aircraft is in front of the receiving aircraft, the indication on both magic eyes will approximately be similar, and in case the distance between the two aircraft diminishes, the magic eyes will open up at the same rate. To the extent that the indications provided by the two magic eyes differ, the transmitting plane will be outside of the flight path of the receiving plane.

The central portion of the instrument panel shows an altitude indicator 93 which is analogous to or even identical with the indicator 71, shown in FIGURE 2. Beneath the indicator 93 or at any other suitable point on the panel, there is provided a flash lamp 94 which may be analogous to the alarm device 77. It should be noted, however, that for this case the alarm indicator 94 is not essential to the same degree as is the alarm device in the embodiment shown in FIGURE 1 and using the relative-signal-strength-indicator 67.

Each of the two magic eyes 91 and 92 indicates also proximity of the transmitter. When the magic eyes open up rather rapidly and to the same, or approximately to the same degree, then the two planes have parallel and oppositely directed flight paths in about the same vertical plane. As was outlined above, indicator 67 of FIGURE 1 does not respond to such a situation, and this is the reason that alarm device 77 in the circuit of FIGURE 1 is an absolute safety necessity. However, if one uses individual indicators for each channel 62 or 63, such as the magic eyes, then the degree of necessity for such an alarm device is diminished.

The necessity for such an alarm however is not obviated, because a still more drastic alarm may be desirable for this particular danger situation even though magic eyes 91 and 92 already provide some indication of proximity in the forward direction. These and other instruments provide a more or less steadily variable indication, whereas imminent danger when established requires threshold response to distinguish between warning and no-warning situations in an on-off type representation. Thus the flasher 94 is a desirable complement for this instrument panel.

It is an important aspect that the anti-collision system as presently suggested does not preclude installation of a more sophisticated, and more accurately working circuitry in the plane. On the other hand, the system is of a nature that even if constructed and installed in its most simple form, it does not provide an economic burden for small aircraft owners, but provides for the general safety of the air traffic, whereby every participant in the air traffic can also participate in the safety system at least at minimum standards. That is to say that the system provides for a minimum safety at low cost, not precluding the possibility that more extensive and expensive receiving systems derive more accurate and more sophisticated information from the very simple transmission.

The system is basically comprised of a very simple transmitter which broadcasts information as to the presence and altitude of an aircraft. Since many aircrafts are already equipped with barometers, and since this type of transmitter can be made very cheaply and economically, such a transmitter can be installed in a very simple manner and at a very low cost. The receiving system has directional lobes which are merely provided to monitor the presence of another aircraft in the most critical region which is the region along the boresight of an aircraft.

The signals as received become automatically stronger the closer the receiving aircraft is to the transmitting aircraft. It is important that for this safety device to operate the information as broadcast on one hand, and as received on the other hand, does not have to include information as to the course direction of the respectively transmitting aircraft. Moreover, it is basically sufficient that only one pilot be warned. Take the situation of two aircrafts flying at different speeds but having a collision course. The faster plane being behind will receive the transmission from the slower flying plane, while still ahead, but not vice versa, due to the configuration of the receiver lobes, here in the antenna system of the slower aircraft. This however is sufficient as a slight course correction by the pilot in the faster flying aircraft suffices to avoid collision.

The circuit network as shown in FIGURE 1 exhibits a minimum degree of expenditure, particularly as far as the alarm situation is concerned. It was stated above that this alarm situation is established if a transmitter, as it may be carried by another aircraft, is positioned within the cone as defined by the two lobes of the receiving antennas, and at a particular minimum distance or less from the receiving aircraft. This alarm situation does not necessarily require the two aircrafts to be on a collision course. Either in the alternative or as an additional substitute the warning system may include circuitry as shown in FIGURE 4.

The circuit shown in FIGURE 4 establishes whether or not the transmitting aircraft is in effect in the flight path of the receiving aircraft. The first condition is, of course, whether or not the transmitting aircraft has the same altitude as the receiving aircraft. In the receiving aircraft this can be established by a coincidence network 76 which responds to, first, the signal provided by its own barometer 82 and, second, the output of the altitude meter 71 because this latter altitude meter processes the signal representing the height of the (other) transmitting aircraft.

Therefore upon establishing coincidence, preferably within a certain tolerance range, a first condition for flight path obstruction is established. This coincidence is not directionally sensitive and similar altitude is, of course, not conclusive for a head-on collision condition; one still needs directional information in the horizontal. The second condition for immediate danger can be established by the signals in the two channels 62 and 63. The strength of these signals, individually and collectively, is indicative of the proximity of the transmitting aircraft with regard to the two receiver lobes of the receiving aircraft. It can thus be seen that collison with another aircraft is possible only if the two signals in the lines 62 and 63 are in effect similar.

The signal processing blocks 62a and 63a may provide noise and threshold rejection levels coupled with rectifier means for providing D.C. output signals for the two channels 62 and 63 in this case. The resulting two D.C. output voltages are then fed to a comparator 78 which, again within certain tolerances, establishes the presence or absence of similarity of two different signals it receives. When the signals as received by the two antennas are similar, then the transmitting aircraft must be in the overlapping portion 12 of the two lobes. Therefore, similarity of height plus the presence of the transmitter in the overlapping lobe portion 12 of the two receiver antennas indicates that the transmitting aircraft is in the flight path of the receiving aircraft, and these signals, therefore, will establish a special alarm situation, which may be provided for in addition to the alarm device 77 or 94.

The invention is not limited to the embodiments described above but all changes and modifications thereof not constituting departures from the spirit and scope of the invention are intended to be covered by the following claims.

What is claimed is:

1. A collision warning system for moving vehicles wherein each vehicle is equipped with a transmitter and a receiver, the transmitter on a vehicle broadcasting continuously in a substantially omnidirectional pattern at a particular high frequency, the signal transmitted by the transmitter being modulated with additional information regarding the location of the transmitter, the receiver on the vehicle comprising:

a pair of directional, receiving antennas each having a major lobe and being mounted on a vehicle to monitor individual portions of the region ahead of the vehicle, the antennas being positioned so that the individual major lobes are oriented in different directions extending into the region ahead of the vehicle, the two lobes substantially including a region in the direction of movement of the vehicle;

a radio signal receiver circuit responsive to signals having the particular frequency, the radio receiver circuit having input and output circuits;

a lobe switch for alternatingly connecting the antennas to the input circuit of the receiver circuit, so that the signals as provided in the output circuit of the receiver circuit alternately represent the signals as received by the antennas;

first circuit means connected to said output circuit of said receiver to provide an indication of the relative strength of the signals as received in alternating lobe switch cycles;

second circuit means connected with said receiver to provide a representation of the modulated signal as receved by at least one of the antennas; and third circuit means having threshold characteristics to respond to a minimum strength of the signal in the output circuit of the receiver circuit to provide an alarm signal.

2. A collision warning system for moving vehicles wherein an aircraft is equipped with a transmitter and with a receiver for receiving signals transmitted by the transmitter of another aircraft, the transmitter of an aircraft comprising, antenna means for broadcasting signals omnidirectionally to a substantial degree, means for continuously providing ultra high frequency signals to the antenna means, and means for modulating the ultra high frequency signals with signals representative of the height of the aircraft;

the receiver on an aircraft comprising a plurality of directionally sensitive receiving antennas oriented to have their respective main lobes extending into the region ahead of the aircraft, the lobes overlapping in the direction of movement of the aircraft, the receiver circuit including a demodulator for demodulating signals having said ultra high frequency, a first lobe switch for alternately connecting the receiving antennas to the input of said receiver circuit, a second lobe switch connected to the output side of said receiver circuit and operating in synchronism with the first lobe switch for separating the output signals as developed by the receiver circuit as to origin in the different antennas, means responsive to the separated output signals to provide a representation of the location of the transmitter on another aircraft in relation to the lobes, and means responsive to the demodulation as provided by the receiver circuit to provide an indication of the height of other aircraft.

3. A collision warning system for aircrafts, comprising:

a transmitter on each aircraft, substantially omnidirectionally radiating an ultra high frequency signal at a predetermined power level, the signal being modulated with a second signal representative of the altitude of the aircraft; and a receiver in each aircraft including a pair of directionally sensitive antennas having major lobes extending in forward direction at oppositely oriented angles to the boresight of the aircraft, first means coupled to the receiver for alternatingly processing the signals as received by the antennas to provide a representation of the relative strength of the signals as received by the antennas of the pair, second means coupled to the receiver to demodulate the signals as received by the antennas to provide an indication of altitude of the aircraft transmitting the signals as received, and third means responsive to the signals as received by the antennas to provide a warning signal, if the signals as received exceed a minimum threshold.

References Cited

UNITED STATES PATENTS 2,157,122   5/1939   Dunmore.
2,463,286   3/1949   Kolster _____ 343—120
2,560,265   7/1951   Adler.

RODNEY D. BENNETT, *Primary Examiner.*

RICHARD E. BERGER, *Assistant Examiner.*